United States Patent
Tomitaka et al.

(10) Patent No.: US 8,353,529 B2
(45) Date of Patent: Jan. 15, 2013

(54) AIRBAG APPARATUS

(75) Inventors: Akihiro Tomitaka, Kanagawa (JP);
Kazumasa Misawa, Kanagawa (JP);
Mitsuru Mochiduki, Aichi (JP);
Shigeyuki Suzuki, Aichi (JP); Kenji Fujimura, Aichi (JP)

(73) Assignees: Toyota Motor East Japan, Inc., Miyagi (JP); Toyota Jidosha Kabushiki Kaisha, Aichi (JP); Toyoda Gosei Co., Ltd., Aichi (JP)

( * ) Notice: Subject to any disclaimer, the term of this patent is extended or adjusted under 35 U.S.C. 154(b) by 54 days.

(21) Appl. No.: 12/677,738

(22) PCT Filed: Sep. 12, 2008

(86) PCT No.: PCT/JP2008/066609
§ 371 (c)(1),
(2), (4) Date: Jul. 2, 2010

(87) PCT Pub. No.: WO2009/035116
PCT Pub. Date: Mar. 19, 2009

(65) Prior Publication Data
US 2010/0283230 A1 Nov. 11, 2010

(30) Foreign Application Priority Data

Sep. 16, 2007 (JP) ................. 2007-240301
Sep. 16, 2007 (JP) ................. 2007-240303

(51) Int. Cl.
*B60R 21/20* (2011.01)
(52) U.S. Cl. ............... 280/730.2; 280/730.1; 280/743.1
(58) Field of Classification Search ............... 280/730.1, 280/730.2, 743.1
See application file for complete search history.

(56) References Cited

U.S. PATENT DOCUMENTS

| 3,795,412 | A | * | 3/1974 | John | 280/730.1 |
| 3,897,961 | A | * | 8/1975 | Leising et al. | 280/730.1 |
| 3,930,664 | A | * | 1/1976 | Parr et al. | 280/732 |
| 5,172,790 | A | * | 12/1992 | Ishikawa et al. | 180/268 |
| 5,222,761 | A | * | 6/1993 | Kaji et al. | 280/730.2 |
| 5,470,103 | A | * | 11/1995 | Vaillancourt et al. | 280/730.1 |
| 5,499,840 | A | * | 3/1996 | Nakano | 280/730.1 |
| 5,507,519 | A | * | 4/1996 | Schettler-Kohler | 280/730.1 |

(Continued)

FOREIGN PATENT DOCUMENTS

JP 3-281458 A 12/1991
(Continued)

OTHER PUBLICATIONS

International Search Report (ISR) issued in PCT/JP2008/066609 (parent application) for Examiner consideration.

(Continued)

*Primary Examiner* — Paul N Dickson
*Assistant Examiner* — Laura Freedman
(74) *Attorney, Agent, or Firm* — Chen Yoshimura LLP

(57) ABSTRACT

The airbag apparatus includes a folded airbag, an inflator and an airbag storage that stores therein the airbag and the inflator. The airbag is inflated by the gas introduced from the inflator in a region between the left seat and the right seat to abut both to a vehicle interior ceiling above the airbag storage and to interior parts of a vehicle interior below the airbag storage. The airbag prevents an occupant sitting in a seat at a side opposite to collision from moving to the collision side.

15 Claims, 8 Drawing Sheets

U.S. PATENT DOCUMENTS

| | | | | |
|---|---|---|---|---|
| 5,775,726 | A * | 7/1998 | Timothy et al. | 280/730.1 |
| 6,460,878 | B2 * | 10/2002 | Eckert et al. | 280/730.1 |
| 6,773,026 | B2 * | 8/2004 | Meyer | 280/729 |
| 6,932,380 | B2 * | 8/2005 | Choi | 280/730.1 |
| 6,966,576 | B1 * | 11/2005 | Greenstein | 280/730.1 |
| 7,000,944 | B2 * | 2/2006 | Bakhsh et al. | 280/730.1 |
| 7,163,229 | B2 * | 1/2007 | Hasebe et al. | 280/730.1 |
| 7,222,877 | B2 * | 5/2007 | Wipasuramonton et al. | 280/730.1 |
| 7,441,796 | B2 * | 10/2008 | Noguchi et al. | 280/730.2 |
| 7,581,750 | B2 * | 9/2009 | Hirata et al. | 280/730.1 |
| 7,594,675 | B2 * | 9/2009 | Bostrom et al. | 280/730.2 |
| 7,971,901 | B2 * | 7/2011 | Tomitaka et al. | 280/730.2 |
| 7,976,058 | B2 * | 7/2011 | Suzuki et al. | 280/729 |
| 8,047,565 | B2 * | 11/2011 | Fukuyama et al. | 280/730.2 |
| 8,210,566 | B2 * | 7/2012 | Fukawatase et al. | 280/730.1 |
| 2002/0024200 | A1 | 2/2002 | Eckert et al. | |
| 2005/0104340 | A1 | 5/2005 | Hasebe et al. | |
| 2009/0001695 | A1 * | 1/2009 | Suzuki et al. | 280/730.2 |
| 2010/0264631 | A1 * | 10/2010 | Tomitaka et al. | 280/730.2 |
| 2010/0295280 | A1 * | 11/2010 | Tomitaka et al. | 280/730.1 |
| 2012/0119475 | A1 * | 5/2012 | Choi et al. | 280/729 |

FOREIGN PATENT DOCUMENTS

| | | | |
|---|---|---|---|
| JP | 03281454 A | * | 12/1991 |
| JP | 5-208647 A | | 8/1993 |
| JP | 2000-185618 A | | 7/2000 |
| JP | 2002-534310 A | | 10/2002 |
| JP | 2004-217109 A | | 8/2004 |
| JP | 2005-067272 A | | 3/2005 |
| JP | 2005-145225 A | | 6/2005 |
| JP | 2006-299698 A | | 11/2006 |
| WO | WO 2006128591 A1 | * | 12/2006 |

OTHER PUBLICATIONS

Written Opinion (PCT/ISA/237) issued in PCT/JP2008/066609 (parent application).

* cited by examiner

AIRBAG APPARATUS

TECHNICAL FIELD

The present invention relates to an airbag apparatus for protecting occupants of an automobile. In particular, the present invention relates to an airbag apparatus by which an airbag is inflated between a plurality of seats arranged in a vehicle width direction in order to prevent, at a side collision, an occupant sitting in a seat at a side opposite to the collision from moving to the collision side.

BACKGROUND ART

As a protection device for reducing the impact to occupants when the automobile is subjected to a frontal collision, an airbag apparatus has been widely diffused. A conventional airbag apparatus is attached in a steering device or an instrument panel provided in front of an occupant. In the case of the conventional airbag apparatus, when the automobile is subjected to a frontal collision, the airbag is inflated at the front side of a driver seat and a front passenger seat to thereby restrain occupants sitting in the driver seat and the front passenger seat from moving to the front side. As a result, the occupants in the driver seat and the front passenger seat are effectively protected at the frontal collision of the automobile.

In recent years, protecting an occupant in an automobile at a side impact of the automobile also has been considered important. Thus, so-called side airbag apparatuses and curtain shield airbag apparatuses have been mounted in vehicles. Specifically, as shown in FIG. 8 for example, at the front passenger seat-side of an automobile 1, a curtain shield airbag apparatus 2 is provided so that an airbag is inflated at a position close to the inner side of the glass at the upper portion of a front door 1*a*. A side airbag apparatus 3 is provided so that an airbag is inflated at a position close to the inner side of the lower portion of the front door 1*a*. In FIG. 8, although the curtain shield airbag apparatus 2 and the side airbag apparatus 3 are shown only at the front passenger seat-side, the curtain shield airbag apparatus 2 and the side airbag apparatus 3 are also provided at the driver seat-side in an actual case.

When another vehicle 4 laterally collides with the automobile 1 as shown by the arrow X in FIG. 8, the curtain shield airbag apparatus 2 and the side airbag apparatus 3 are respectively inflated at a position close to the inner sides of the front door 1*a*, i.e., an outer region of the front passenger seat, to thereby protect the body of the occupant of the front passenger seat from having a direct contact with the front door 1*a*.

On the other hand, Patent Document 1 discloses an airbag apparatus that is attached within the ceiling of a vehicle interior. At a frontal collision of an automobile, an airbag is inflated downwardly at the front side of the occupant.

Patent Document 2 discloses an airbag apparatus that is attached within the instrument panel in front of the front passenger seat for example. At a frontal collision of an automobile, an airbag body is inflated at the front side of the occupant of the front passenger seat and a panel member provided in the vicinity of the ceiling is turned in the lower direction to thereby regulate a part of the airbag body inflated to the inner side of the vehicle interior from moving to the rear side in the vicinity of the ceiling.

Patent Document 3 discloses an airbag apparatus that is attached in an instrument panel in front of the front passenger seat for example. At a frontal collision of the automobile, an airbag body is inflated at the front side of the occupant of the front passenger seat and a panel member attached in the vicinity of the ceiling is turned in the lower direction to thereby regulate the airbag body from moving to the rear side in the vicinity of the ceiling so as to prevent a part of the airbag body inflated to the inner side of the vehicle interior from expanding between the head of the occupant and the ceiling.

In recent years, in order to restrain, at aside collision, the body of an occupant sitting at a side opposite to the collision from moving to the collision side, a center airbag apparatus has been suggested in which an airbag is inflated between two seats (e.g., Patent Documents 4 and 5).
Patent Document 1: JP2000-185618A
Patent Document 2: JP2005-067272A
Patent Document 3: JP2005-145225A
Patent Document 4: JP2004-217109A
Patent Document 5: JP2006-299698A

DISCLOSURE OF THE INVENTION

Problem to be Solved by the Invention

In the case of the curtain shield airbag apparatus 2 and the side airbag apparatus 3 shown in FIG. 8, when another vehicle 4 collides against the vehicle from the left side, an occupant sitting at the opposite side to the side collision, occupant sitting in the right seat in the shown case, a force is generated to move the occupant to the collision side as shown by the arrow A, i.e., a force to move the occupant to the left side.

In the case of the airbag apparatus disclosed in Patent Document 1 on the other hand, although the airbag from the ceiling is inflated at the front side of the occupant so as to protect at the frontal collision the occupant in the rear seat, the airbag apparatus is not configured so as to protect the occupant at the side collision.

Similarly, the airbag apparatuses according to Patent Document 2 and Patent Document 3, which intend to protect an occupant at the frontal collision, do not intend to protect a neighboring occupant at the side collision.

By the way, it is preferred that the occupant receives a reaction force from the airbag itself to thereby restrain the occupant from moving to left or right, when the airbag is inflated and deployed. However, when the airbag is inflated among the plurality of seats arranged in the vehicle width direction, a reaction force cannot be given to the occupant body because the vehicle interior has no structure for accepting the inflated airbag itself.

In view of the above points, it is an objective of the present invention to provide an airbag apparatus that restrains, at a side collision with another vehicle, an occupant from moving in the lateral direction and that allows, when the airbag is inflated, the airbag to give the reaction force to the occupant.

SUMMARY OF THE INVENTION

To achieve an object described above, in the present invention, an airbag apparatus that is provided in a vehicle and that protects an occupant has a folded airbag, an inflator for jetting gas into the airbag, and an airbag storage means that is provided at the center in a vehicle width direction of the vehicle and that stores therein the airbag and the inflator, wherein the airbag is inflated by the gas introduced from the inflator and is abutted to a plurality of interior parts of a vehicle interior.

In the above configuration, the airbag is abutted, in an inflated status, to the plurality of interior parts of the vehicle interior including any of a vehicle interior ceiling, a vehicle interior seat, a floor carpet of the vehicle interior, a back face of a front seat, and an inner face of a front glass.

In the above configuration, the vehicle includes therein a plurality of seats arranged in the vehicle width direction, the airbag is inflated by the gas introduced from the inflator, and an upper end and a lower end of the airbag are abutted to a vehicle interior ceiling and a vehicle interior lower side, respectively.

In the above configuration, the airbag in an inflated status has an upward expansion margin at the upper end and a downward expansion margin at the lower end.

In the above configuration, the airbag in the inflated status is formed so that both side faces in the vicinity of the middle in a height direction protrude to both sides of a vehicle width direction.

In the present invention, an airbag apparatus that is provided in a vehicle and that protects an occupant has a folded airbag and an inflator for jetting gas into the airbag, the airbag is inflated by the gas introduced from the inflator and is abutted to interior parts of a vehicle interior, and the interior parts of the vehicle interior guide an inflating direction of the airbag.

In the above configuration, the airbag is inflated in a substantially upward direction by the gas introduced from the inflator and is abutted to a vehicle interior ceiling, and the vehicle interior ceiling guides the airbag so that the airbag is inflated in a frontward direction.

In the above configuration, the airbag is inflated in the frontward direction and is then inflated in a substantially downward direction.

In the above configuration, the inflator is provided so as to jet gas in the substantially upward direction to allow the airbag to be inflated in the substantially upward direction at an initial inflation stage.

In the above configuration, the airbag is inflated in a substantially downward direction by the gas introduced from the inflator, and is abutted to at least any of a vehicle interior seat and a floor carpet of the vehicle interior to be further inflated in a frontward direction.

In the above configuration, the airbag is inflated in a frontward direction and is then inflated in a substantially upward direction.

In the above configuration, the inflator is provided so as to jet gas in a substantially downward direction to allow the airbag to be inflated in the substantially downward direction at an initial inflation stage.

In the above configuration, the vehicle includes therein a plurality of seats arranged in a vehicle width direction, and the airbag and the inflator are stored in an airbag storage means provided between the plurality of seats.

In the above configuration, the airbag in the maximum inflation status is formed so that each of outlines of left and right side faces has a rear portion having a gas inflow opening, an upper portion close to a vehicle interior ceiling, and a lower portion positioned at a lower end, the airbag is stored at an inner side of an airbag storage means in an order of the rear portion, the upper portion, and the lower portion, when the gas is introduced from the inflator to the airbag, the airbag is successively inflated in an order of the rear portion, the upper portion, and the lower portion.

In the above configuration, the airbag in the maximum inflation status is formed so that each of outlines of left and right side faces has a rear portion having a gas inflow opening, an upper portion close to a vehicle interior ceiling, and a lower portion positioned at a lower end, the airbag is stored in an airbag storage means by being successively folded from the lower portion via the upper portion to the rear portion, when the gas is introduced from the inflator to the airbag, the airbag is successively inflated in an order of the rear portion, the upper portion, and the lower portion.

In the above configuration, the airbag storage means is formed at an upper part of a center console having a substantially L-like shape that consists of an armrest portion extending in a vehicle front-and-rear direction and a vertical portion formed to extend upwardly in a substantially vertical direction from a rear portion of the armrest portion at a position corresponding to a seat back of the seat.

Effect of the Invention

According to the airbag apparatus of the present invention, when gas introduced from the inflator causes the airbag to be inflated, the airbag is abutted to the plurality of interior parts of the vehicle interior. Thus, friction is generated between the airbag and the interior parts of the vehicle interior at the respective portions at which the airbag is abutted to the interior parts of the vehicle interior. As a result, the airbag is retained by the respective interior parts of the vehicle interior. Thus, the occupant can receive the reaction force from the airbag. Furthermore, when the airbag is inflated, the inflating direction changes while the airbag is being abutted to each of the interior parts of the vehicle interior. Thus, the airbag is securely abutted to the plurality of interior parts of the vehicle interior, thus securely retaining the airbag.

DESCRIPTION OF THE REFERENCE NUMERALS

10, 60: Airbag apparatus;
11, 61: Airbag;
11B: Airbag rear portion;
11D: Airbag lower portion;
11U: Airbag upper portion;
12: Airbag storage means;
13, 62: Inflator;
20, 40, 80, 90: Vehicle;
21: Center console;
21B: Center console base;
21H: Center console armrest portion;
21V: Center console vertical portion;
22L, 22R, 70L, 70R: Seat;
23L, 23R: Seat cushion;
24L, 24R: Seat back;
25, 85: Vehicle interior ceiling;
50: Panel;

51: Airbag door;
55: Retainer;
55A: Retainer base portion;
55B: Retainer side plate portion;
56: Hook;
61a: Airbag upper end;
61b: Airbag lower end;
61c: Airbag side face;
62: Inflator;
63: Case; and
86: Vehicle interior lower side

BEST MODE FOR CARRYING OUT THE INVENTION

Figure 1:
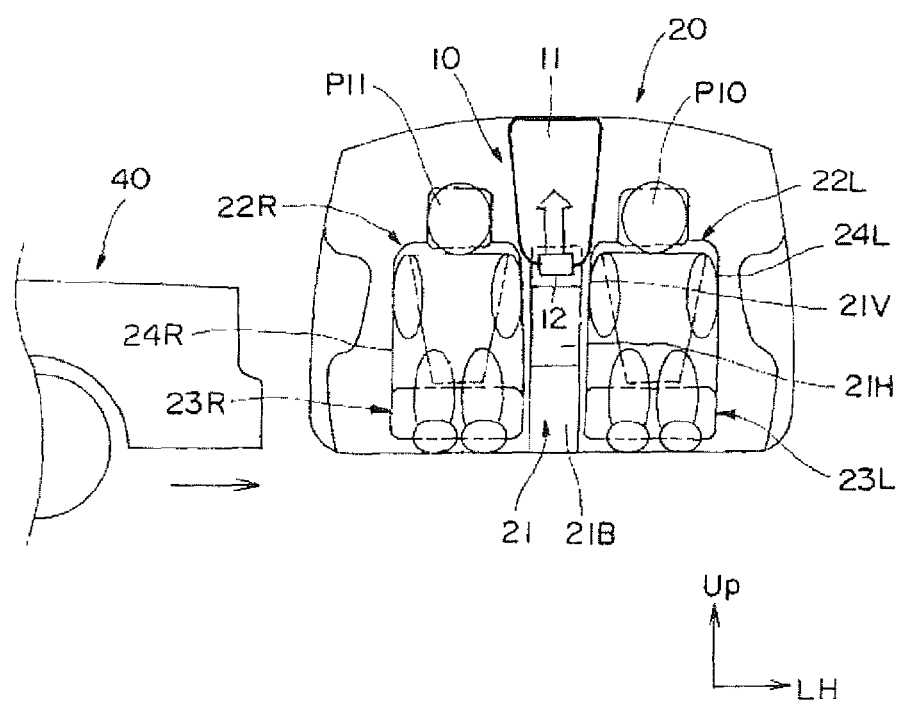
FIG. 1 illustrates an airbag apparatus according to one embodiment of the present invention and shows an initial inflated status of an airbag from the front side of a vehicle.
Figure 2:
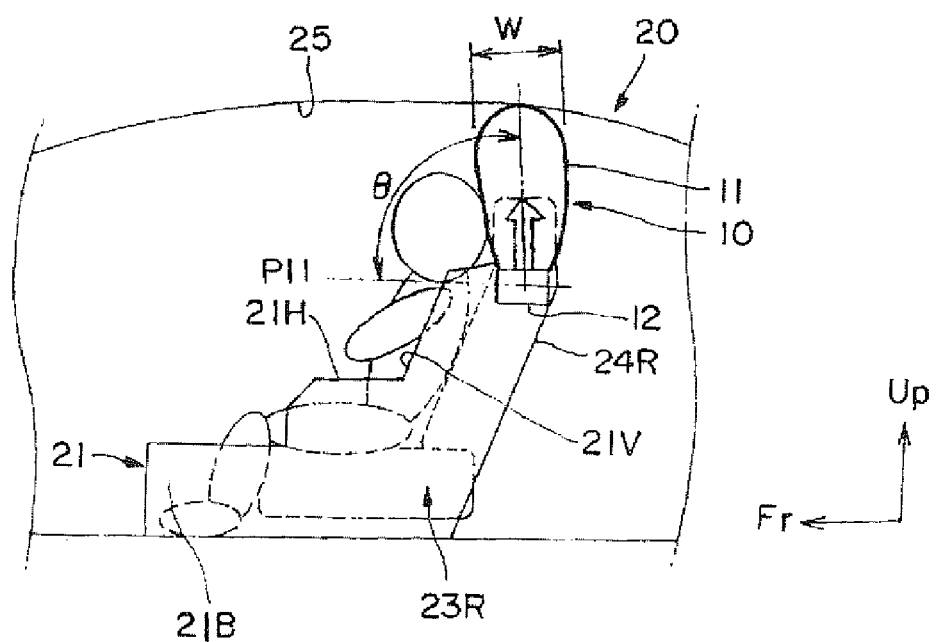
FIG. 2 is a partial perspective side view illustrating the status shown in FIG. 1 seen from a side.
Figure 3:
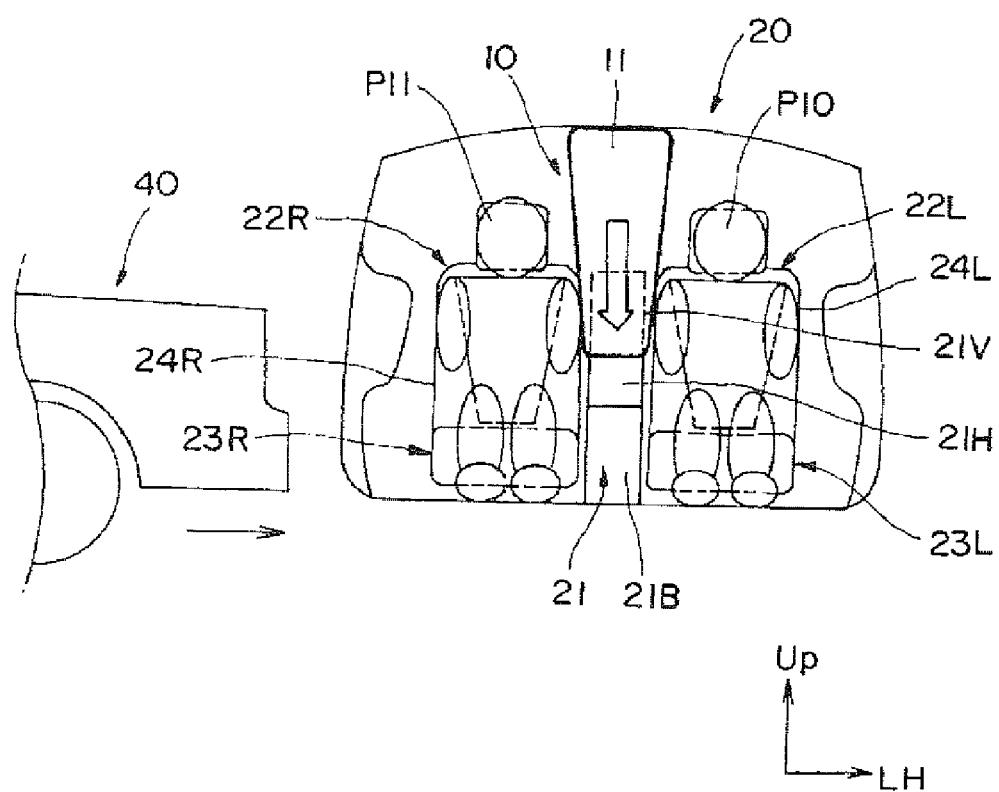
FIG. 3 illustrates the airbag apparatus shown in FIG. 1 and illustrates the inflated status of the airbag seen from the front side of the vehicle.
Figure 4:
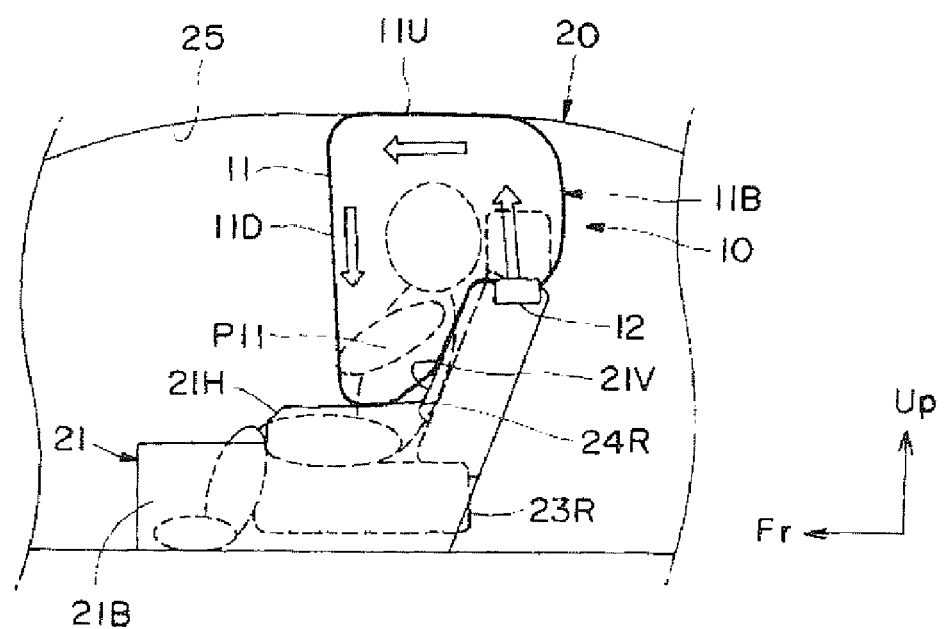
FIG. 4 is a partial perspective side view illustrating the status shown in FIG. 3 seen from the side.
Figure 5:
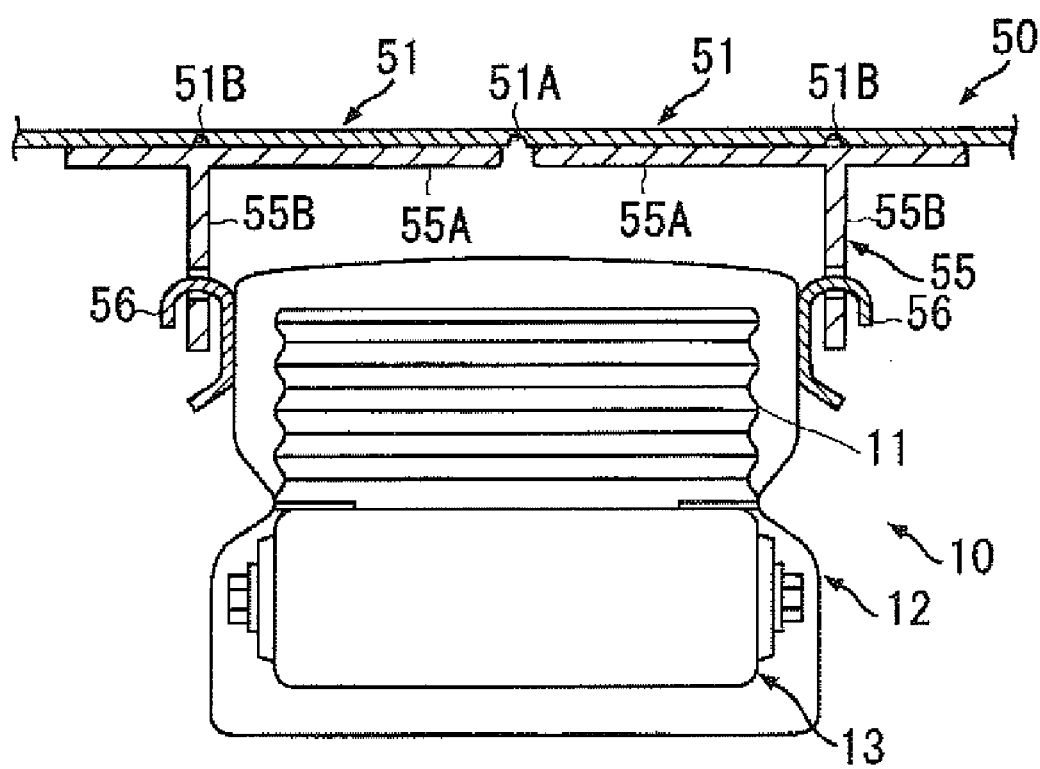
FIG. 5 is a schematic view illustrating the airbag apparatus shown in FIG. 1.

Hereinafter, some embodiments of the present invention will be described in detail with reference to the drawings. FIG. 1 to FIG. 5 illustrate an airbag apparatus 10 according to one embodiment of the present invention. FIG. 1 illustrates the initial inflated status of the airbag seen from the front side of the vehicle. FIG. 2 is a partial perspective side view illustrating the status shown in FIG. 1 seen from a side. FIG. 3 illustrates the inflated status of the airbag shown in FIG. 1 seen from the front side of the vehicle. FIG. 4 is a partial perspective side view illustrating the status shown in FIG. 3 seen from the side. FIG. 5 is a schematic view illustrating the airbag apparatus shown in FIG. 1. In the drawings, Fr represents the front side of a vehicle 20, Up represents the upper side, and LH represents the left side of the vehicle width direction.

The airbag apparatus 10 according to one embodiment of the present invention is installed in the vehicle 20 that has two seats 22R and 22L arranged in the vehicle width direction for example. As shown in FIG. 1, the seat 22R and the seat 22L have therebetween a center console 21. The airbag apparatus 10 is provided at the upper portion of the center console 21. The upper portion of the center console 21 has an airbag storage means 12 in which an airbag 11 is stored in a folded status. The inflator 13 is provided in the airbag storage means 12. A sensor (not shown) is attached to the vehicle 20. This sensor senses an impact caused when another vehicle 40 collides against the vehicle from a side.

As shown in FIG. 5, the airbag apparatus 10 is supported, for example, by a vehicle body constituting member, e.g., reinforcement (not shown) that is provided at the back side of an upper panel 50 of the center console 21. The airbag 11 has a bag-like shape having a gas introduction opening and is configured by sewing a woven fabric consisting of a polyester yarn or a polyamide yarn. The inflator 13 is connected to the gas introduction opening of the airbag 11. When the inflator 13 receives a sensing signal from the sensor, the inflator 13 jets gas to be introduced into the airbag 11. gas introduction opening of the airbag 11. When the inflator 13 receives a sensing signal from the sensor, the inflator 13 jets gas to be introduced into the airbag 11.

As shown in FIG. 5, the upper panel 50 is formed so that two rectangular airbag doors 51, 51 are adjacent to each other and the airbag 11, 11 can be opened to both sides at the boundary therebetween. The upper panel 50 is cut, for example, along the boundary between the two airbag doors 51, 51 and along the outline thereof by a dotted line, a straight line or the like. A cutoff 51A is formed at the boundary between the two airbag doors 51, 51. A cutoff 51B is formed at the outline other than the boundary between the two airbag doors 51, 51.

The upper panel 50 is constituted by a synthetic resin-made panel base member formed to have a predetermined shape out of polypropylene for example or is constituted by adhering a surface member on the outer face of the panel base member.

At the back side of the upper panel 50, a retainer 55 is attached to a region in which the airbag doors 51 are formed. The retainer 55 is integrally formed by resin molding to include a base portion 55A that is provided to cover the airbag doors 51 and the surrounding airbag door periphery; and a pair of side plate portions 55B raised from the base portion 55A. The respective side plate portions 55B include penetration holes to which the pair of hooks 56 are locked, respectively. The retainer 55 and the pair of hooks 56 are used to attach the airbag storage means 12 to the back side of the upper panel 50.

When the sensor senses an impact due to a side collision, a sensing signal is inputted to the inflator. Upon receiving the input of the sensing signal from the sensor, the inflator 13 supplies gas to the airbag 11. Then, the airbag 11 is inflated. In this embodiment, when another vehicle collides against the vehicle 20 from a side, the airbag 11 is inflated between a left seat 22L and a right seat 22R.

This will be described in further detail. The center console 21 is provided between the left seat 22L and the right seat 22R. The center console 21 has: a base 21B extending from the rear end positions of the seat cushions 23L and 23R of the seats 22L and 22R to a position of a footrest space in front of the seat cushions 23L and 23R in a substantially horizontal direction; an armrest portion 21H that is formed in the upper portion of the base 21B and that extends from the base end positions of the seat backs 24L and 24R to the front end positions of the seat cushions 23L and 23R in a substantially horizontal direction; and a vertical portion 21V that is inclined from the rear end portion of the armrest portion 21H to a slightly rear side and that extends in the upward direction to a position slightly higher than the upper ends of the seat backs 24L and 24R.

In the vicinity of the upper end portion of the center console 21, the airbag storage means 12 is provided. The airbag storage means 12 is provided at the same height as those of the shoulder portions of the seat backs 24L and 24R. The folded airbag 11 is inflatably stored in the airbag storage means 12. The inflator is provided in the airbag storage means 12. At a side collision for example, the inflator 13 jets gas into the airbag 11. Then, the airbag 11 is inflated. In the first embodiment, the inflator 13 is provided so that the gas is jetted in an upward direction, i.e., in a direction slightly inclined, when seen from the right side, from the front side of the vehicle to the front side at an angle of about 90 degrees in the counterclockwise direction.

The left and right side faces seen from the side of the airbag 11 have the rear portion 11B, the upper portion 11U and the lower portion 11D. The airbag 11 is stored in the airbag storage means 12 such that the rear portion 11B, the upper portion 11U, and the lower portion 11D are stored in this order. The airbag 11 is inflated as shown in FIG. 3 and FIG. 4 so that the rear portion 11B, the upper portion 11U, and the lower portion 11D are inflated successively. The airbag 11 may be folded by being successively rounded from the lower portion 11D via the upper portion 11U to the rear portion 11B so that the airbag 11 is finally stored in the airbag storage means 12. In this case, the airbag 11 is similarly successively inflated in the order of the rear portion 11B, the upper portion 11U, and the lower portion 11D.

The following section will describe the shape of the airbag 11 when the airbag 11 is inflated at maximum. When the maximally-inflated airbag 11 is seen from the front side of the vehicle 20, the airbag 11 has, as shown in FIG. 3, a trapezoidal outline in which the upper side thereof is relatively wide and is abutted to the vehicle interior ceiling 25 and the lower side thereof is relatively narrow and is abutted to the upper face of the armrest portion 21H of the center console 21. When the airbag 11 is seen from the right side of the vehicle 20, the airbag 11 has, as shown in FIG. 4, a substantially L-like outline that extends in an oblique direction from the airbag storage means 12 to extend to the front side along the vehicle interior ceiling 25, subsequently extend in the lower direction to abut to the armrest portion 21H and extends along the surface of the center console 21.

The airbag 11 is composed, in order to have the three-dimensional shape shown in FIG. 3 and FIG. 4 during the inflation, of: a front cloth portion forming a front face, a ceiling cloth portion forming an upper face, a bottom cloth portion forming a bottom face, a rear cloth portion forming a back face, and left and right side cloth portions forming left and right side faces for example.

These front cloth portion, ceiling cloth portion, bottom cloth portion, rear cloth portion, and left and right-side cloth portions are formed, for example, by cutting a flexible cloth sheet to have an appropriate shape and by sewing the corresponding edges of these portions. The airbag 11 has a bag-like shape having a substantially three dimensional trapezoidal shape so that the ceiling cloth portion is abutted to the vehicle interior ceiling 25 in a relatively large area and the bottom cloth portion is abutted to the upper face of the armrest portion 21H of the center console 21 in a relatively small area. A gas introduction opening (not shown) through which the gas from the inflator is introduced to the airbag 11 is provided in the rear cloth portion of the airbag 11 for example.

A structure of the inflated airbag between the vehicle interior ceiling 25 and the armrest portion 21H in particular, i.e., the shape of the airbag 11 from the middle stage to the final stage of the inflation process of the airbag 11 is not limited to the illustrated example and may be an arbitrary shape. The reason is that the shape is not influenced by the angle at which the gas from the inflator 13 is jetted and is not influenced by the shape of the airbag 11 at the initial stage of the inflation.

When an impact at a certain level or higher is sensed, the airbag 11 according to this embodiment is inflated from the airbag storage means 12 set at the upper end of the center console 21 as an inflation starting point to be inflated between the two seats 22L and 22R arranged in vehicle width direction. During this initial inflation stage, as shown in FIG. 2, the airbag 11 is inflated to have a predetermined upward angle θ at which the airbag is slightly inclined to the front side of the vehicle 20 and a predetermined width W at which the airbag is not abutted to the occupants P10 and P11 while being abutted to the vehicle interior ceiling 25. Next, in the middle inflation stage, as shown in FIG. 4, the airbag expands along the vehicle interior ceiling 25 toward the front side of the vehicle 20 until an appropriate width is reached. Next, in the final inflation stage, the airbag expands downwardly to reach the upper face of the armrest portion 21H of the center console 21. Thus, at the initial inflation stage, the airbag 11 has the highest inner pressure. The airbag 11 is inflated so as to avoid the occupants P10 and P11 in a general sitting status or other different sitting statuses and expands toward the vehicle interior ceiling 25. At the middle and final stages, the airbag 11 has a reduced inner pressure. The airbag 11 is inflated between the two seats 22L and 22R. The inner pressure of the inflator 13 is generally highest at the start of the jetting of gas and slightly changes thereafter as time passes since the gas jetting. Thus, when the airbag 11 is abutted to the vehicle interior ceiling 25, the airbag 11 applies a high pressure to the vehicle interior ceiling 25.

Furthermore, as shown in FIG. 3 and FIG. 4, when the airbag 11 is inflated at maximum, i.e., in a deployed status, the upper portion of the airbag 11 is abutted to the vehicle interior ceiling 25 and is caught by friction. The lower portion of the airbag 11 is abutted to the armrest portion 21H of the center console 21 and is caught by friction. That is, the airbag 11 is inflated by the introduction of gas from the inflator. Then, the upper portion 11U and the lower portion 11D of the airbag 11 are abutted to the vehicle interior ceiling 25 and the center console 21 in fixed areas, respectively. This restrains the airbag 11 even when the deployed airbag 11 receives an external force in the vehicle width direction. Thus, the airbag 11 itself is retained by the interior parts of the vehicle interior. Even when the upper body of the occupant receives a force in the vehicle width direction due to the side collision, the airbag 11 gives the reaction force to the occupant to thereby block the upper body of the occupant from moving to the side of the side collision.

Any one of a portion of the airbag 11 and a portion of the interior parts of the vehicle interior may have a higher surface friction coefficient or rigidity than those of other portions which are abutted to the vehicle interior. In order to increase the surface friction coefficient, at least the portions abutted to the interior, for example, the surface roughness of the cloth of the airbag 11 or the interior parts of the vehicle interior may be increased. In order to increase the rigidity, the thickness of the cloth of the airbag 11 may be increased or a plurality of cloths may be superposed or the interior parts of the vehicle interior may have an increased thickness.

When the gas from the inflator 13 is introduced in the airbag 11, the airbag 11 is inflated in the substantially upward direction and is abutted to the vehicle interior ceiling 25 and is inflated in a frontward direction by the vehicle interior ceiling 25. That is, the vehicle interior ceiling 25 guides the airbag 11. The airbag 11 is inflated to the front side and is subsequently inflated in the lower direction. As described above, when the airbag 11 is abutted to the interior parts of the vehicle interior, the inflating direction of the airbag 11 is guided by the interior parts of the vehicle interior.

Other embodiments will be described.

In the case of a vehicle not including a center console, an airbag storage means is provided at the side portion of the backrest of the seat or a rear package tray for example. As a result, the airbag is inflated between two seats.

In the above-described example, the airbag is inflated by the gas introduced from the inflator and is abutted to the center console and the vehicle interior ceiling, respectively. However, the airbag also may be abutted not only to the center console and the vehicle interior ceiling but also to a floor carpet in the vehicle interior, a back face of a front seat, and an inner face of a front glass. That is, when the airbag is in the deployed status, the airbag may be abutted to a plurality of interior parts of the vehicle interior including any of the vehicle interior ceiling, a vehicle interior seat, the floor carpet of the vehicle interior, the back face of the front seat, and the inner face of the front glass. The reason is that, when the airbag is being inflated, the airbag is abutted to the plurality of interior parts of the vehicle interior to cause a frictional force to retain the airbag. As in the above description, even when the side collision causes a force to the occupant in the vehicle width direction, the reaction force is applied from the airbag to the occupant to thereby catch the occupant by the airbag, thus protecting the occupant more securely.

In the above-described example, the airbag storage means is provided in the center console. By the gas introduced from the inflator to the airbag, the airbag is inflated in the substantially upward direction and is abutted to the vehicle interior ceiling to be inflated in the front direction. Then, the airbag is inflated in the lower direction and is abutted to the center console to be inflated to the rear direction. However, this is merely an example. Thus, the airbag storage means may be provided in the vehicle interior ceiling for example at such a position that is a substantially center position in the vehicle width direction and that is between the left and right seats or that is at the upper side between left and right seating regions. In this case, when the gas is introduced from the inflator to the airbag, the airbag is inflated in the substantially downward direction and is abutted, for example, to the lower end of the vehicle interior, e.g., a seat, the console box, the vehicle interior floor seat, to be inflated in the frontward direction and then is inflated to the upper side and is abutted to the vehicle interior ceiling to be inflated to the rear side. When the airbag is guided so as to have the varying inflating direction, the airbag is abutted to various interior parts of the vehicle interior, including not only the vehicle interior ceiling and the vehicle interior carpet but also the back face of the front seat and the inner face of the front glass. The inflator is positioned to the gas introduction opening of the airbag so that the airbag is inflated, when starting inflating, in the substantially upward or downward direction.

Figure 6:
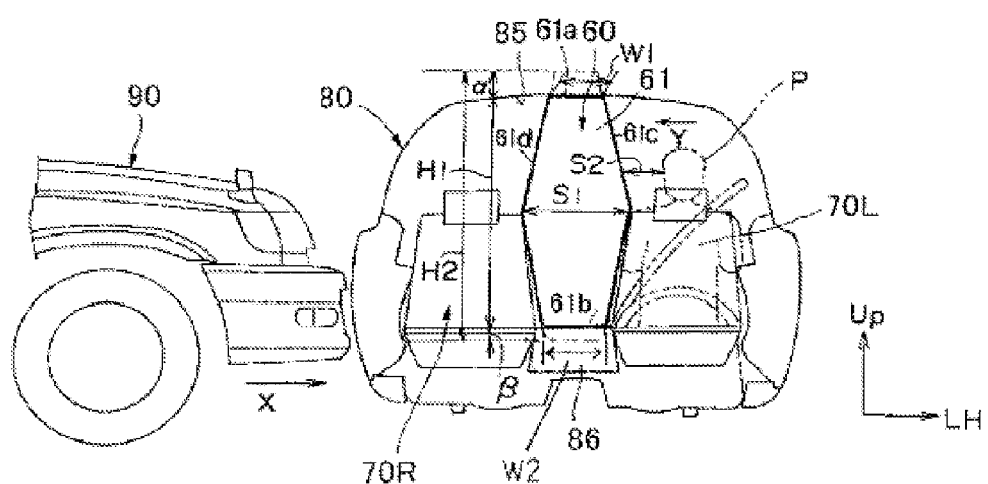
FIG. 6 illustrates an airbag apparatus according to another embodiment of the present invention and shows the inflated airbag seen from the front side of the vehicle.
Figure 7:
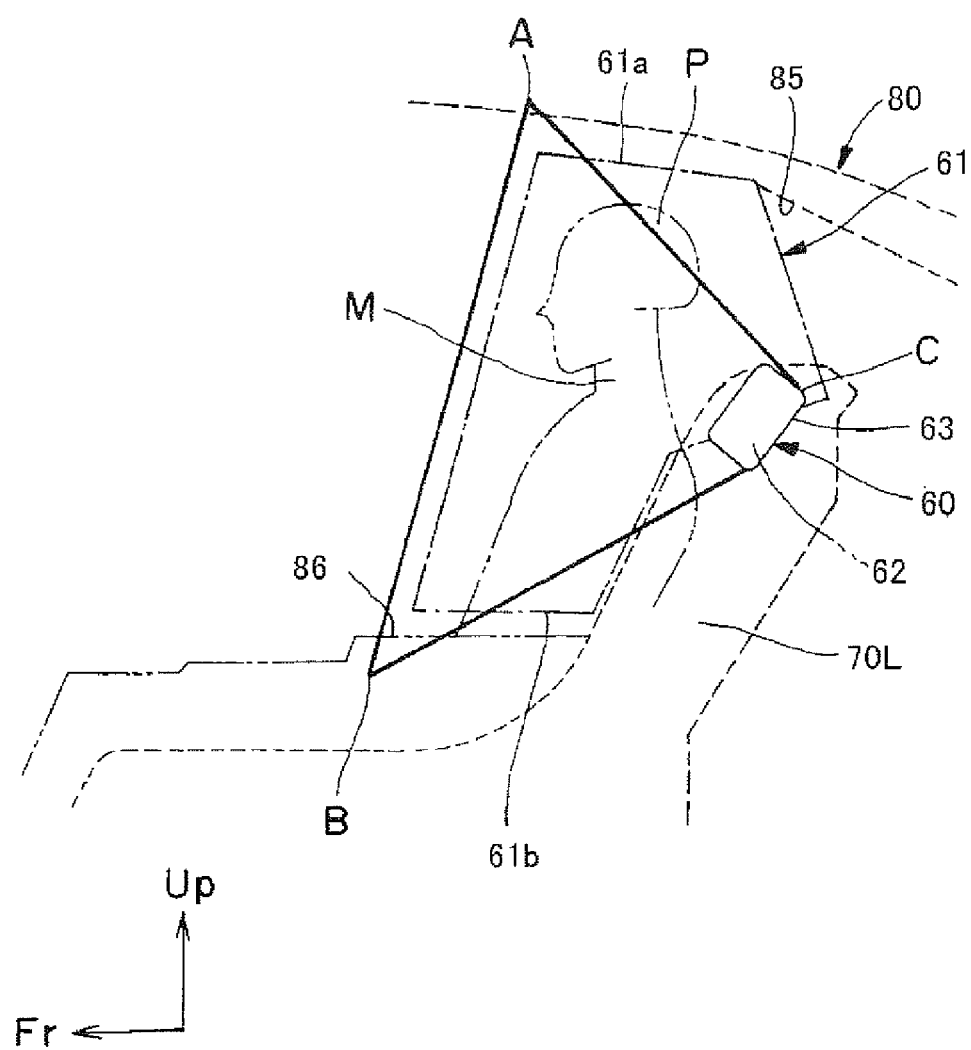
FIG. 7 is a side view schematically illustrating the inflated status of the airbag shown in FIG. 6.
Figure 8:
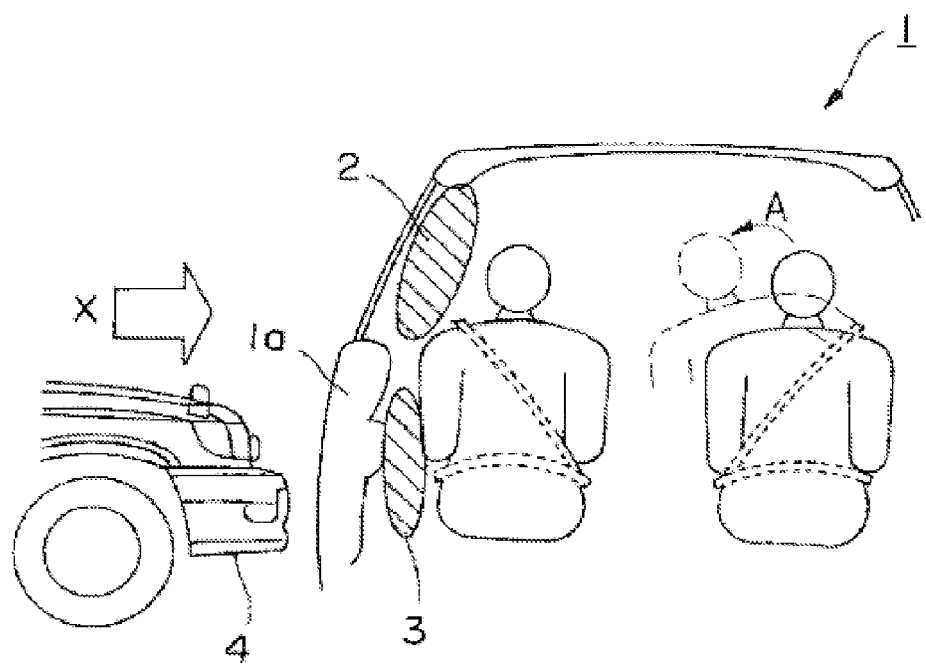
FIG. 8 is a schematic back view illustrating a conventional airbag apparatus.

The shape of the airbag at the maximum inflation is not limited to the above-described one. This will be described specifically. FIG. 6 and FIG. 7 illustrate another embodiment. FIG. 6 illustrates the airbag apparatus according to another embodiment where the inflated airbag status is seen from the front side of the vehicle. FIG. 7 is a side view schematically illustrating the inflating status of the airbag shown in FIG. 6. In the airbag apparatus 60 for a lateral collision according to another embodiment, when another vehicle 90 collides with a vehicle 80 having two seats 70L and 70R arranged in the vehicle width direction, the body of the occupant P sitting in a seat 70L at a side opposite to the collision is regulated from moving to the collision side by inflating the airbag 61 at substantially the center in the vehicle width direction, i.e., at a region between the two seats 70L and 70R.

The airbag apparatus 60 is provided between the seat backs of the two seats 70L and 70R. The airbag apparatus 60 includes an inflator 62 for jetting gas into the airbag 61 in order to inflate the airbag 61. The inflator 62 may be provided in the seat back side faces of the seats 70L and 70R instead of being provided in the center console.

In a general status prior to a collision where the airbag 61 is not used, the airbag 61 is stored in a folded status in a case 63. When a partition member (not shown) raised from the vehicle interior floor is provided between the seat backs of the two seats 70L and 70R for example, the case 63 is attached to the partition member. The inflator 62 is also provided in the case 63. This case 63 corresponds to the airbag storage means in the above-described embodiment.

When the side face of the vehicle 80 is subjected to a collision with another vehicle 90, then a sensor (not shown) attached to the vehicle body senses the impact by the collision. When the inflator 62 receives a detection signal from the sensor, then the reception thereof triggers the inflator 62 to jet gas into the airbag 61. Then, the airbag 61 is inflated.

The following section will describe the shape of the airbag 61 at the maximum inflation. As shown in FIG. 6 and FIG. 7, the airbag 61 has a bag-like shape and is made of woven fabric. In the maximum inflation status, the upper end 61a of the airbag 61 is abutted to the vehicle interior ceiling 85 and the lower end 61b of the airbag 61 is abutted to the vehicle interior lower side 86. When the vehicle interior ceiling 85 includes various instruments for example, the upper end 61a of the airbag 61 is abutted, during the inflation, to the interior parts of the vehicle interior such as various instruments. The lower end 61b of the airbag 61 is abutted, during the inflation of the airbag 61, to the vehicle interior lower side 86, i.e., to the center console in the shown example. On the other hand, the lower end 61b of the airbag 61 may be abutted to the vehicle interior floor, the seat cushion or the like depending on the structure of the automobile.

In order to allow, when the airbag 61 is inflated, the upper end 61a and lower end 61b of the airbag 61 to be abutted to the vehicle interior ceiling 85 and the vehicle interior lower side 86 with a predetermined pressure, the airbag 61 has the maximum inflated distance H2 in the up-and-down direction set to be longer than the distance between the vehicle interior ceiling 85 and the vehicle interior lower side 86 (vehicle interior height H1). That is, when the airbag 61 is being inflated, the airbag 61 has an upward expansion margin α at the upper end 61a of the airbag 61 and a downward expansion margin β at the lower end 61b. As a result, the airbag 11 in an inflated status is abutted to the vehicle interior ceiling 85 and the vehicle interior lower side 86 and is then still inflated to the maximum inflated distance H2 to be thereby abutted to the vehicle interior ceiling 85 and the vehicle interior lower side 86 at a predetermined pressure. At the same time, the upper end 61a and the lower end 61b are abutted to the vehicle interior ceiling 85 and the vehicle interior lower side 86 in increased areas W1 and W2, thereby generating a strong frictional force.

As shown in FIG. 7, the airbag 61 is inflated from the position between the seat backs at which the case 63 is attached to the front side. Thus, when being seen from the side, a triangle ABC is formed by an abutment position A at which the upper end 61a of the airbag 61 is abutted to the vehicle interior ceiling 85, an abutment position B at which the lower end 61b of the airbag 61 is abutted to the vehicle interior lower side 86, and an attachment position C of the airbag 61. The load center M of the occupant P is accommodated within the inner region of this triangle ABC. More specifically, the abutment position A is in front of the position of the upper body of the occupant at the ceiling, the abutment position B is a position that is at the upper face of the center console for example and that is at the front side of the abutment position A, and the attachment position C is a height position between the shoulder and the waist of the occupant.

When the airbag 61 is in the maximum inflation status, both of the side faces 61c and 61d in the vicinity of the middle of the height direction protrude to both sides of the vehicle width direction. In the shown case, the airbag 61 in the maximum inflation status is formed to have a cross-sectional shape in which both of the side faces 61c and 61d protrude to the left and right occupants, i.e., to entirely have a rhombic or hexagonal cross-sectional shape.

The operation of the airbag apparatus 60 will be described. In a normal status where the airbag 11 is not inflated, the airbag 61 is stored in the case 63. When another vehicle 40 collides against the right side of the vehicle 80 in this normal status, a not-shown sensor detects the impact by the collision. This detection triggers the inflator 62 to jet gas into the airbag 61. As a result, as shown in FIG. 6 and FIG. 7, the airbag 61 is inflated between the two seats 70L and 70R. Then, the upper end 61a and the lower end 61b of the airbag 61 are securely abutted to the vehicle interior ceiling 85 and the vehicle interior lower side 86 by the above-described respective expansion margins α and β. Then, the upper end 61a of the airbag 61 is slid on the vehicle interior ceiling 85 and friction is caused between the lower end 61b of the airbag 61 and the vehicle interior lower side 86, e.g., console box.

Thus, when the vehicle is subjected to a collision with another vehicle 90 from the right side as shown by the arrow X, the airbag 61 is inflated in a region between the two seats 70L and 70R. Thus, even when the occupant at the opposite side of the side collision (at side opposite to the collision), i.e., the occupant P at the front passenger seat-side, receives a load by the impact by the side collision directed to the collision side as shown by the arrow Y, the airbag 61 is instantaneously inflated to the collision side of the occupant P to elastically apply a reaction force to the occupant P, thus restraining the body of the occupant P from moving to the collision side.

Then, both of the side faces 61c and 61d of the airbag 61 protrude at the middle in the height direction to the both sides of the vehicle width direction. Thus, even when the side face 61c of the airbag 61 collides with the upper body of the occupant P of the side opposite to the collision, the force acting from the occupant to the airbag 61 is absorbed. During this, the airbag 61 has a cross-sectional shape in the vehicle width direction that is difficult to be bent or deformed. Specifically, if both of the side faces 61c and 61d do not protrude in the vicinity of the middle in the height direction to both sides of the vehicle width direction, the airbag 61 itself tends to be deformed around the point at which the airbag 61 collides with the body of the occupant P to thereby have a dogleg-like cross-sectional shape in the vehicle width direction. In this case, a risk is caused where the pressure from the upper end 61a and the lower end 61b to the vehicle interior ceiling 85 and the vehicle interior lower side 86 is weakened to thereby reduce the frictional force. However, both of the side faces 61c and 61d protruding at the middle in the height direction to both sides of the vehicle width direction restrain the cross section in the vehicle width direction from being deformed to have a dogleg-like shape. Thus, when the side face 61c collides with the body of the occupant P of the side opposite to the collision, the airbag 11 is abutted to the vehicle interior ceiling 85 and the vehicle interior lower side 86 at fixed areas respectively to thereby cause friction. Thus, the load applied to the occupant due to the collision impact is absorbed by the airbag 61, thereby protecting the occupant P.

At a side collision, when the body of the occupant P of the side opposite to the collision is abutted to the side face 61c of the inflated airbag 61, the load center M of the occupant P acts within the inner region of the triangle ABC consisting of the abutment positions A and B at which the upper end 61a and the lower end 61b of airbag 61 are abutted to the vehicle interior ceiling 85 and the vehicle interior lower side 86 and the attachment position C of the airbag 61. Thus, a region in the vicinity of the load center M of the body of the occupant P is covered by the side face 61c of the airbag 61. Thus, at a side collision, the body of the occupant P at the side opposite to the collision is prevented from being dislocated from the airbag 61, thus securely protecting the occupant P.

In the example shown in FIG. 6 and FIG. 7, the airbag is formed to have, during an inflated status, an angled cross-sectional shape at both side faces of the airbag. However, the invention is not limited to the shown example. Thus, the airbag also may have other cross-sectional shapes, e.g., circular arc or polygonal cross-sectional shape, so that portions in the vicinity of the middle in the height direction protrude to both sides. A structure of the airbag apparatus 60 for attaching the airbag 61 and the inflator 62 for example to the partition member or the like is the same as the conventionally-known attachment structure of the airbag apparatus.

Although the shown examples show different seats arranged in the vehicle width direction, when the seat backs of the left and right seats are formed integrally and continuously, the airbag apparatus 60 is provided at the center of the seat backs in the vehicle width direction or at a predetermined portion in a region between the seating positions.

Although the shown examples mainly show a case where the airbag 11 is inflated between the occupants in the front seats, i.e., the driver seat and the front passenger seat, the invention is not limited to this. The invention can be applied to a case where a vehicle has plural rows of seats, e.g., rear seats or seats in three rows. In the case where a bench seat or three or more seats in which three or more occupants sit in the lateral direction are arranged in the vehicle width direction, the airbag apparatus also may be provided so that airbags are inflated at regions among the respective seating positions or the respective seats.

Although the above-described embodiment describes a case where the airbag apparatus is provided in the passenger car, the invention is not limited to this. For example, the airbag apparatus can be provided in a large automobile such as a bus or a truck.

As described above, when the impact by the side collision is sensed, gas is introduced from the inflator and the airbag is deployed while being sequentially abutted to the respective interior parts of the vehicle interior to be inflated in a varying direction. Specifically, the airbag is inflated in a direction that varies depending on the respective interior parts of the vehicle interior. Furthermore, when the airbag is inflated, the airbag is abutted to the respective interior parts of the vehicle interior to thereby retain the airbag. As a result, when the body of the occupant touches the airbag, the occupant can receive the reaction force from the airbag.

What is claimed is:

1. An airbag apparatus that is provided in a center console between a left seat and a right seat of a vehicle and that protects an occupant, comprising:
    a folded airbag;
    an inflator for jetting gas into the airbag; and
    an airbag storage means that stores therein the airbag and the inflator,
    wherein the airbag is inflated by the gas introduced from the inflator provided in a region between the left seat and the right seat so as to abut both a vehicle interior ceiling above the airbag storage means and a plurality of interior parts of a vehicle interior below the airbag storage means.

2. The airbag apparatus according to claim 1,
    wherein the airbag is abutted, in an inflated status, to the plurality of interior parts of the vehicle interior including the vehicle interior ceiling and a center console provided between a left seat and a right seat.

3. The airbag apparatus according to claim 1, wherein: the airbag in an inflated status has an upward expansion margin at an upper end and a downward expansion margin at a lower end.

4. The airbag apparatus according to claim 1,
    wherein the airbag in the inflated status is formed so that both side faces in the vicinity of the middle in a height direction protrude to both sides of a vehicle width direction.

5. The airbag apparatus according to claim 1,
    wherein the airbag is inflated by the gas introduced from the inflator and is abutted to interior parts of a vehicle interior and the interior parts of the vehicle interior guide an inflating direction of the airbag.

6. The airbag apparatus according to claim 5,
    wherein the airbag is inflated in a substantially upward direction by the gas introduced from the inflator and is abutted to a vehicle interior ceiling and the vehicle interior ceiling guides the airbag so that the airbag is inflated in a frontward direction.

7. The airbag apparatus according to claim 6,
wherein the airbag is inflated in the frontward direction and is then inflated in a substantially downward direction.

8. The airbag apparatus according to claim 6,
wherein the inflator is provided so as to jet gas in the substantially upward direction to allow the airbag to be inflated in the substantially upward direction at an initial inflation stage.

9. The airbag apparatus according to claim 5,
wherein the airbag is inflated in a substantially downward direction by the gas introduced from the inflator and is abutted to at least any of a vehicle interior seat and a floor carpet of the vehicle interior to be further inflated in a frontward direction.

10. The airbag apparatus according to claim 9,
wherein the airbag is inflated in a frontward direction and is then inflated in a substantially upward direction.

11. The airbag apparatus according to claim 9,
wherein the inflator is provided so as to jet gas in a substantially downward direction to allow the airbag to be inflated in the substantially downward direction at an initial inflation stage.

12. The airbag apparatus according to claim 5,
wherein the airbag in the maximum inflation status is formed so that each of outlines of left and right side faces has a rear portion having a gas inflow opening, an upper portion close to a vehicle interior ceiling, and a lower portion positioned at a lower end, the airbag is stored at an inner side of an airbag storage means in an order of the rear portion, the upper portion, and the lower portion, and when the gas is introduced from the inflator to the airbag, the airbag is successively inflated in an order of the rear portion, the upper portion, and the lower portion.

13. The airbag apparatus according to claim 5,
wherein the airbag in a maximum inflation status is formed so that each of outlines of left and right side faces has a rear portion having a gas inflow opening, an upper portion close to a vehicle interior ceiling, and a lower portion positioned at a lower end, the airbag is stored in an airbag storage means by being successively folded from the lower portion via the upper portion to the rear portion, and when the gas is introduced from the inflator to the airbag, the airbag is successively inflated in an order of the rear portion, the upper portion, and the lower portion.

14. The airbag apparatus according to claim 1, wherein the airbag storage means is formed at an upper portion of the center console.

15. The airbag apparatus according to claim 14,
wherein the center console has an armrest portion extending in a vehicle front-and-rear direction and a vertical portion formed to extend upwardly in a substantially vertical direction from a rear portion of the armrest portion at a position corresponding to a seat back of one of the seats.

\* \* \* \* \*